(12) United States Patent
Zayatz (10) Patent No.: US 6,437,239 B1
(45) Date of Patent: *Aug. 20, 2002

(54) PROTECTION DEVICE AND METHOD OF DETERMINING EXPOSURE TEMPERATURE

(75) Inventor: Robert Zayatz, North Tonawanda, NY (US)

(73) Assignee: Wilson Greatbatch, Ltd., Clarence, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/643,808

(22) Filed: Aug. 22, 2000

Related U.S. Application Data (63) Continuation-in-part of application No. 09/404,934, filed on Sep. 24, 1999, now Pat. No. 6,205,034.

(51) Int. Cl.⁷ .................................................. H01M 2/02
(52) U.S. Cl. ...................... 174/52.1; 361/824; 429/164; 429/170
(58) Field of Search ................................ 174/52.1, 52.3; 361/824; 429/164, 163, 165, 170, 171, 172, 1, 7, 46, 99, 100

(56) References Cited

U.S. PATENT DOCUMENTS

| | | | |
|---|---|---|---|
| 3,663,301 A | 5/1972 | Ralston et al. ............... 136/107 |
| 3,841,913 A | 10/1974 | Anderson .................... 136/107 |
| 4,047,790 A | 9/1977 | Carino ........................ 339/220 |
| 4,237,199 A | * 12/1980 | Gelin ........................... 429/94 |
| 4,302,517 A | 11/1981 | Dziak ........................... 429/66 |
| 4,670,362 A | 6/1987 | Wiacek et al. ............... 429/174 |
| 4,957,832 A | 9/1990 | Ruggeberg et al. .......... 429/164 |
| 4,970,073 A | 11/1990 | Arzur et al. ................. 429/152 |
| 5,194,340 A | 3/1993 | Kosako ........................... 429/1 |
| 5,264,303 A | 11/1993 | McCaffery .................... 429/99 |
| 5,283,137 A | 2/1994 | Ching .......................... 429/175 |
| 5,376,467 A | 12/1994 | Abe et al. ....................... 429/7 |
| 5,434,017 A | 7/1995 | Berkowitz et al. ............. 429/94 |
| 5,529,858 A | 6/1996 | Wicker et al. ............... 429/149 |
| 5,532,081 A | 7/1996 | DePalma et al. ............ 429/171 |
| 5,549,985 A | 8/1996 | Heller et al. ................. 429/157 |
| 5,589,293 A | 12/1996 | Pope et al. ................... 429/172 |
| 5,663,013 A | * 9/1997 | Narukawa et al. ........... 429/164 |
| 5,672,443 A | 9/1997 | Salisbury ..................... 429/185 |
| 5,750,283 A | 5/1998 | DePalma et al. .............. 429/56 |
| 5,759,713 A | 6/1998 | DePalma et al. .............. 429/54 |
| 5,770,328 A | 6/1998 | Friedli et al. .................. 429/96 |
| 5,776,631 A | 7/1998 | Wu .............................. 429/171 |
| 5,786,980 A | 7/1998 | Evans .......................... 361/502 |
| 5,821,010 A | 10/1998 | Taylor .......................... 429/172 |
| 5,843,597 A | 12/1998 | Getz ............................. 429/174 |
| 5,849,431 A | * 12/1998 | Kita et al. .................... 429/164 |
| 6,099,987 A | * 8/2000 | Daniel-Ivad et al. ......... 429/141 |
| 6,205,034 B1 | * 3/2001 | Zayatz ......................... 361/824 |

OTHER PUBLICATIONS

Patent Abstracts of Japan, Publication No. 07201358, dated Aug. 04, 1995.
Patent Abstracts of Japan, Publication No. 09231959, dated Sep. 05, 1997.
Patent Abstracts of Japan, Pub. No. 11026029, Title: Battery.

* cited by examiner

*Primary Examiner*—Chau N. Nguyen
*Assistant Examiner*—Carmelo Oliva
(74) *Attorney, Agent, or Firm*—Hodgson Russ LLP (57) ABSTRACT

A protection device and a method of protecting an electrical component. The protection device has a protective housing and a terminal cap. The protective housing has a base with a contact hole therethrough for receiving an electrical terminal pin, and has a projecting shoulder extending from the base to a first distance from the base. The protective housing also has a retaining clip extending from the base to a second distance from the base, the second distance being greater than the first distance. The terminal cap has a first side and a second side, and in use, at least part of the first side of the terminal cap contacts the projecting shoulder and at least part of the second side of the terminal cap contacts the retaining clip. A method according to the present invention includes steps for determining the temperature to which the protective housing was exposed.

15 Claims, 9 Drawing Sheets

PROTECTION DEVICE AND METHOD OF DETERMINING EXPOSURE TEMPERATURE

CROSS-REFERENCE TO RELATED APPLICATION

This application is a continuation-in-part of U.S. patent application Ser. No. 09/404,934, which was filed on Sep. 24, 1999. This application claims the benefit of U.S. patent application Ser. No. 09/404,934 under the provisions of 35 U.S.C. 120.

BACKGROUND OF THE INVENTION

1. Field of the Invention

The present invention relates generally to devices and methods of protecting an electrical component. More specifically, the present invention relates to a protection device for an electrical component connected to a battery, and a method of determining the temperature to which the protective housing was exposed.

2. Discussion of Related Art

In the prior art, there are devices for protecting an electrical component, such as a fuse and diode assembly, connected to and mounted on a battery. Such prior art devices include a cylindrical spacer ring and a terminal cap. The spacer ring is positioned on an end of the battery. The electrical component resides within the spacer ring, and is electrically connected to the battery by at least one, and sometimes two electrical, leads. Another electrical lead of the electrical component is connected to the terminal cap.

To assemble the battery, the electrical component and the prior art spacer ring, an electrically insulating half-moon disk is placed on the battery header. Next, the electrical component is placed on the half-moon disk. Then the first electrical lead of the electrical component is welded to a terminal pin of the battery. If provided, a second electrical lead of the electrical component is welded to the header of the battery. Next, the spacer ring is placed on the battery so as to encircle the electrical component. Then the volume within the spacer ring and above the battery, which is not occupied by the electrical component, is filled with an adhesive material, which may be a polyamide material such as AD-TECH 700 manufactured by Adhesive Technologies, Inc. of Hampton, N.H. (sometimes referred to as "hot-melt"), or which may be an epoxy or silicone material. In doing so, the electrical component is substantially covered with the adhesive material. Only a portion of an electrical lead of the electrical component extends out of and is not entirely covered with the adhesive material. Next, an insulating disk is placed partially into the adhesive material, and a terminal cap is placed over the insulating disk, as well as that portion of the adhesive material which is not covered by the insulating disk. Finally, the exposed electrical lead of the electrical component extending from the adhesive material is welded to the terminal cap.

Such prior art assemblies have disadvantages. For example, manufacturing such prior art assemblies take a great amount of time, are costly and are messy, primarily due to the adhesive material. Furthermore, a substantial amount of scrap material is generated in manufacturing such prior art assemblies. Finally, if the electrical component does not operate properly, removal and replacement with a properly operating electrical component is difficult, if not impossible. Finally, the prior art devices do not provide a method of determining the temperature to which the protective housing, and therefore the electrical component, has been exposed.

SUMMARY OF THE INVENTION

Accordingly, it is an object of the present invention to provide a protection device. Another object of the present invention is to provide a protection device and method which permits but does not require the use of adhesive material when assembling the battery and an electrical component.

Yet another object of the present invention is to provide a protection device that permits replacement of an improperly operating electrical component.

The foregoing objectives are realized by the present invention, which is a protection device for an electrical component that has a protective housing and a terminal cap. The protective housing has a base with a contact hole therethrough for accommodating an electrical terminal pin. A projecting shoulder extends from the base to a first distance from the base. In addition, a retaining clip extends from the base to a second distance from the base, the second distance being greater than the first distance. The terminal cap has a first side and a second side, and in use, at least part of the first side of the terminal cap contacts the projecting shoulder and at least part of the second side of the terminal cap contacts the retaining clip to thereby capture the terminal cap between the projecting shoulder and the retaining clip.

In a method according to the present invention, a battery and a protective housing, such as that referred to above, are provided. The protective housing is exposed to an environment and then the surface of the protective housing is compared to a standard to determine the temperature of the environment.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which.

BEST MODE FOR CARRYING OUT THE INVENTION

Figure 1:
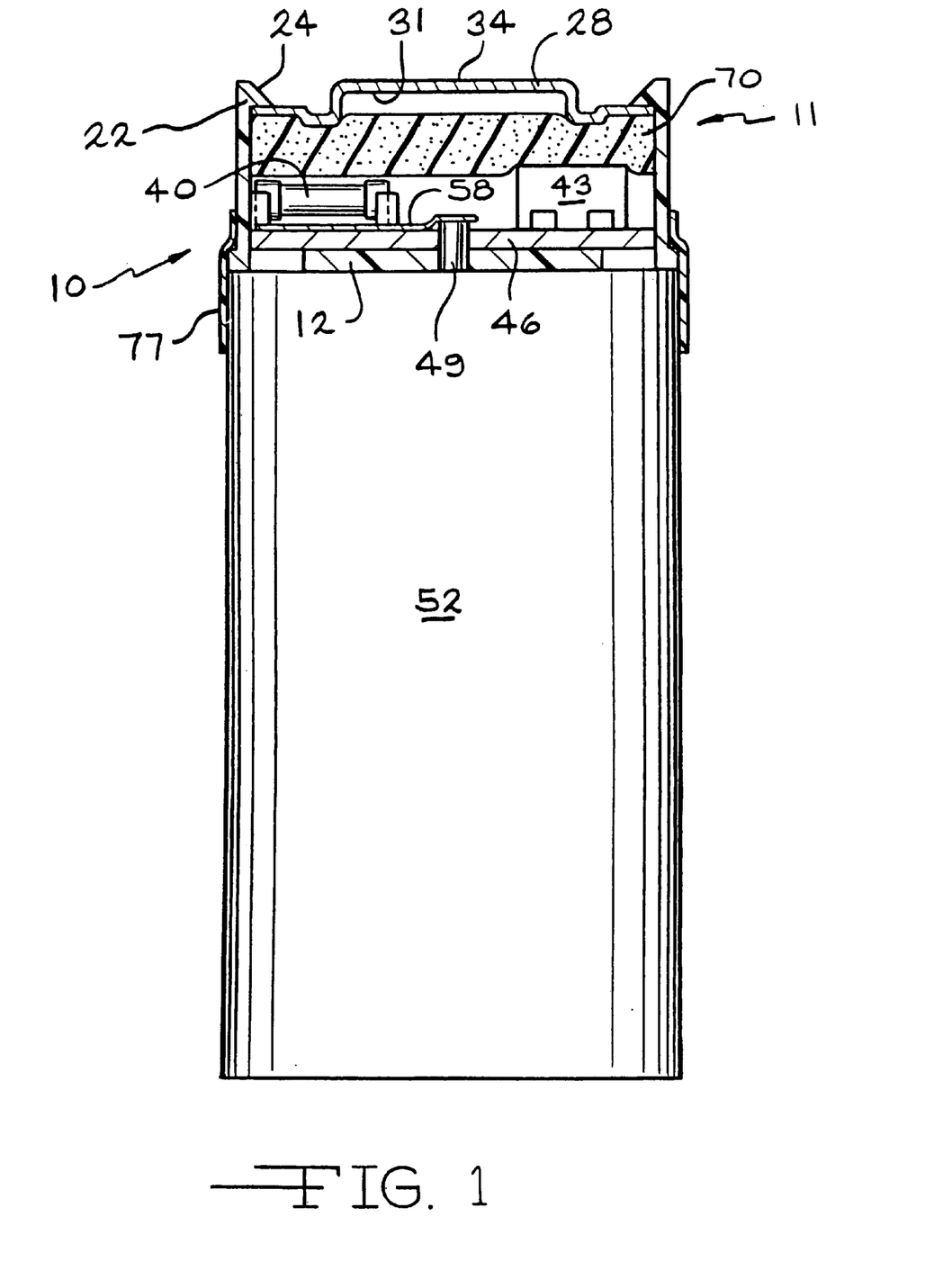
FIG. 1 is a partially cross sectioned side view of a protection device according to the present invention mounted on the header of a battery.
Figure 2:
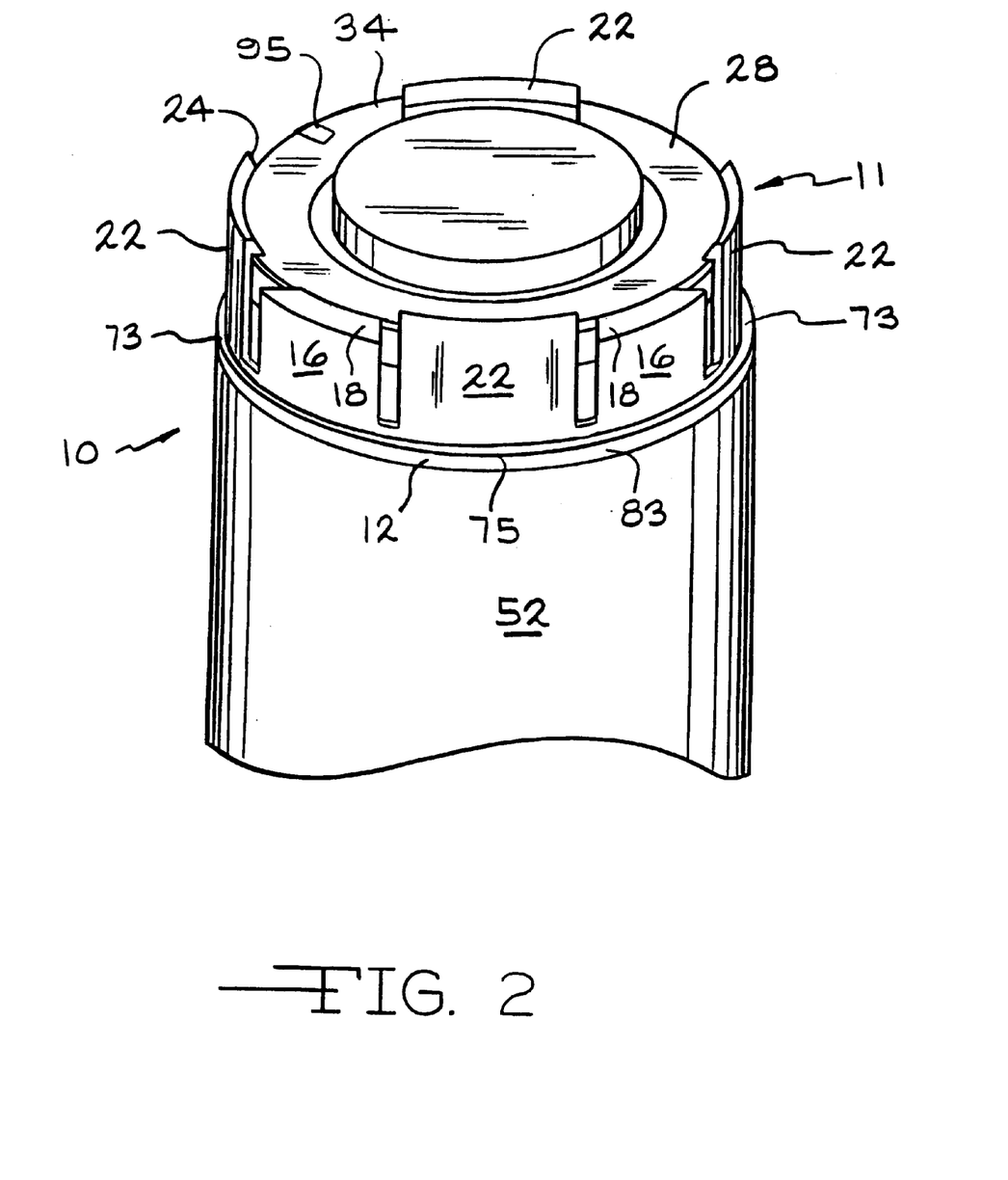
FIG. 2 is a perspective view of the protection device shown in FIG. 1.
Figure 3:
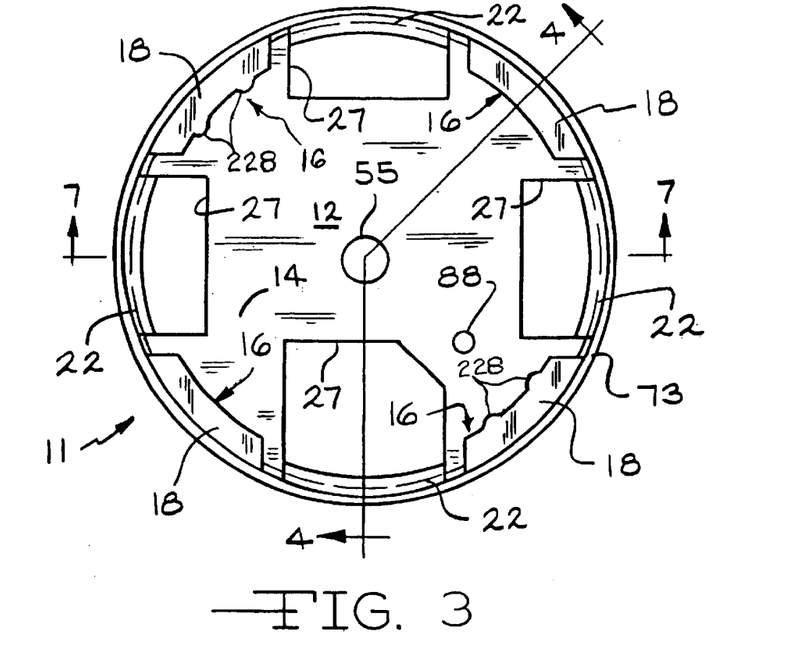
FIG. 3 is a top view of the protective housing according to the present invention.

FIGS. 1 and 2 show a protection device 10 according to the present invention in the assembled form. The protection device 10 includes a protective housing 11 (shown also in FIGS. 3, 4, 5A and 5B) having a base 12. As shown in FIGS. 3, 4, 5A and 5B, extending from a primary surface 14 of the base 12 is a projecting shoulder 16 having a curved side wall 17 extending to an upper surface 18, which is generally parallel to the primary surface 14. The curved side wall 17 extends generally perpendicularly from the primary surface 14 so that the upper surface 18 is at a first distance 19 from the primary surface 14.

Figure 4:
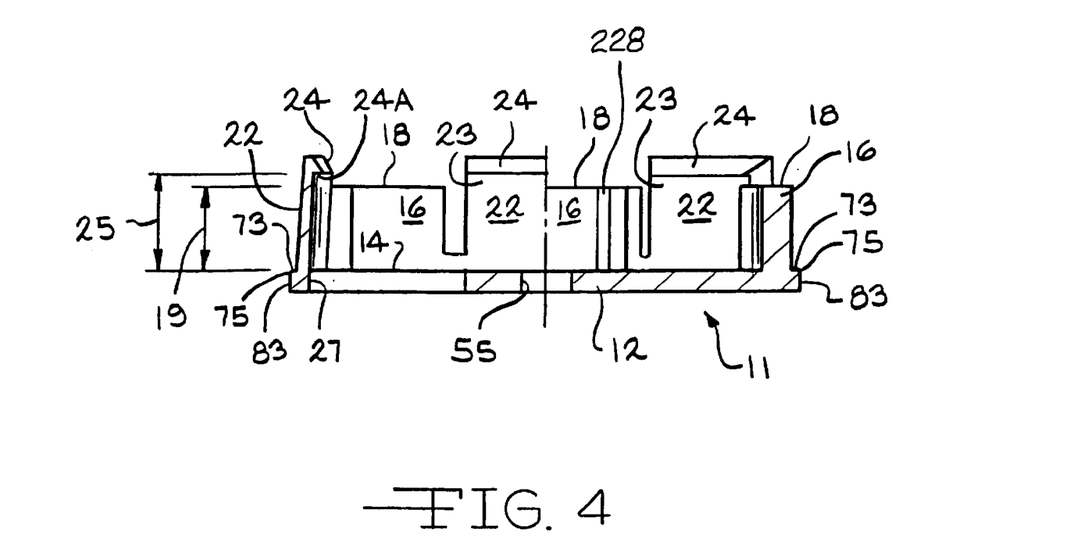
FIG. 4 is a cross sectional view of the protective housing taken along line 4—4 shown in FIG. 3.

The protective housing 11 also has a retaining clip 22 having an arcuate side wall 23 terminating in a hook portion 24. The hook portion 24 provides a retaining ledge 24A, which is generally parallel to the primary surface 14. The retaining ledge 24A is spaced from the primary surface 14 a second distance 25 above the primary surface 14. As shown in FIG. 4, the second distance 25 is greater than the first distance 19.

A material which is suitable for the protective housing 11 includes polyetheretherketone, such as that sold under the tradename Victrex (PEEK) 450-G manufactured by Victrex USA Inc. of Westchester, Pa., or alternatively a polyamide-imide available from DSM Engineering Plastic Products, Inc. of Reading, Pa. as Torlon 4203 PAI. Also suitable for the protective housing 11 and available from DSM Engineering Plastic Products, Inc. is a material marketed under the name Ketron™ PEEK 1000. Another material suitable for the protective housing 11 is liquid crystal polymer, commonly known as Zenite, and available from E.I. du Pont de Nemours and Company. Other materials suitable for the protective housing 11 include 6/6 nylon and glass filled nylon. One type of glass filled nylon is sold under the tradename Nylon Zytel 70G33L.

Glass filled nylon is particularly useful when it is desirable to know the temperature of the environment in which the protective housing 11 was placed. It has been shown that glass filled nylon changes color as the exposure temperature increases. By comparing the color of the glass filled nylon to a standard, the exposure temperature can be determined.

For example, in one embodiment of the present invention, the protective housing 11 was made from glass filled nylon dyed omni rocket red, CC-UN3872, manufactured by the Reed Spectrum company of Holden, Mass. When the environment temperature was at or below 100° C. no detectable color change was observed. However, at 125° C. the color was medium red, at 150° C. the color was dark red, at 175° C. the color was darker red, at 200° C. the color was black, at 225° C. the color was darker black and at 250° C. the color was dark black.

Furthermore, at 225° C. and above, the appearance of the surface of the protective housing 11 changed in ways other than color. At 225° C., the surface of the protective housing 11 was observed to be shinier and grain boundaries could be observed without the aid of a magnifier. At 250° C., the surface of the protective housing 11 was shinier and more grain boundaries could be observed. Color changes and surface appearance changes have been noted when the protective housing 11 is made from 6/6 nylon that is not glass filled or dyed, i.e. has an off-white or light tan color prior to being exposed to high temperatures.

The protective housing 11 may have at least three separate projecting shoulders 16 and at least three separate retaining clips 22. A measure of safety can be provided if four separate retaining clips 22 are provided, as shown in FIGS. 2, 3, 5A and 5B. As shown in FIGS. 2, 3, 5A, 5B and 6, a plurality of projecting shoulders 16 and retaining clips 22 may be provided in an alternating configuration about the circumference of the base 14.

To facilitate manufacturing the retaining clips 22, for example by injection molding, molding orifices 27 may be provided in the base 12. The molding orifices 27 allow a portion of a mold to extend through the base 12 to form the retaining ledge 24A at the second distance 25. Once the retaining clips 22 are formed, the mold is withdrawn through the molding orifices 27.

The protection device 10 according to the present invention also includes a terminal cap 28. As shown in FIGS. 1 and 2, a portion of a first side 31 of the terminal cap 28 rests on the upper surface 18 of the projecting shoulder 16. In addition, a portion of a second side 34 of the terminal cap 28 contacts the retaining ledge 24A of the retaining clip 22. The difference between the first distance 19 and the second distance 25 may be such that the terminal cap 28 is firmly held against the upper surface 18 of the projecting shoulder 16 and the retaining ledge 24A of the retaining clip 22, as shown in FIG. 2.

Figure 5A:
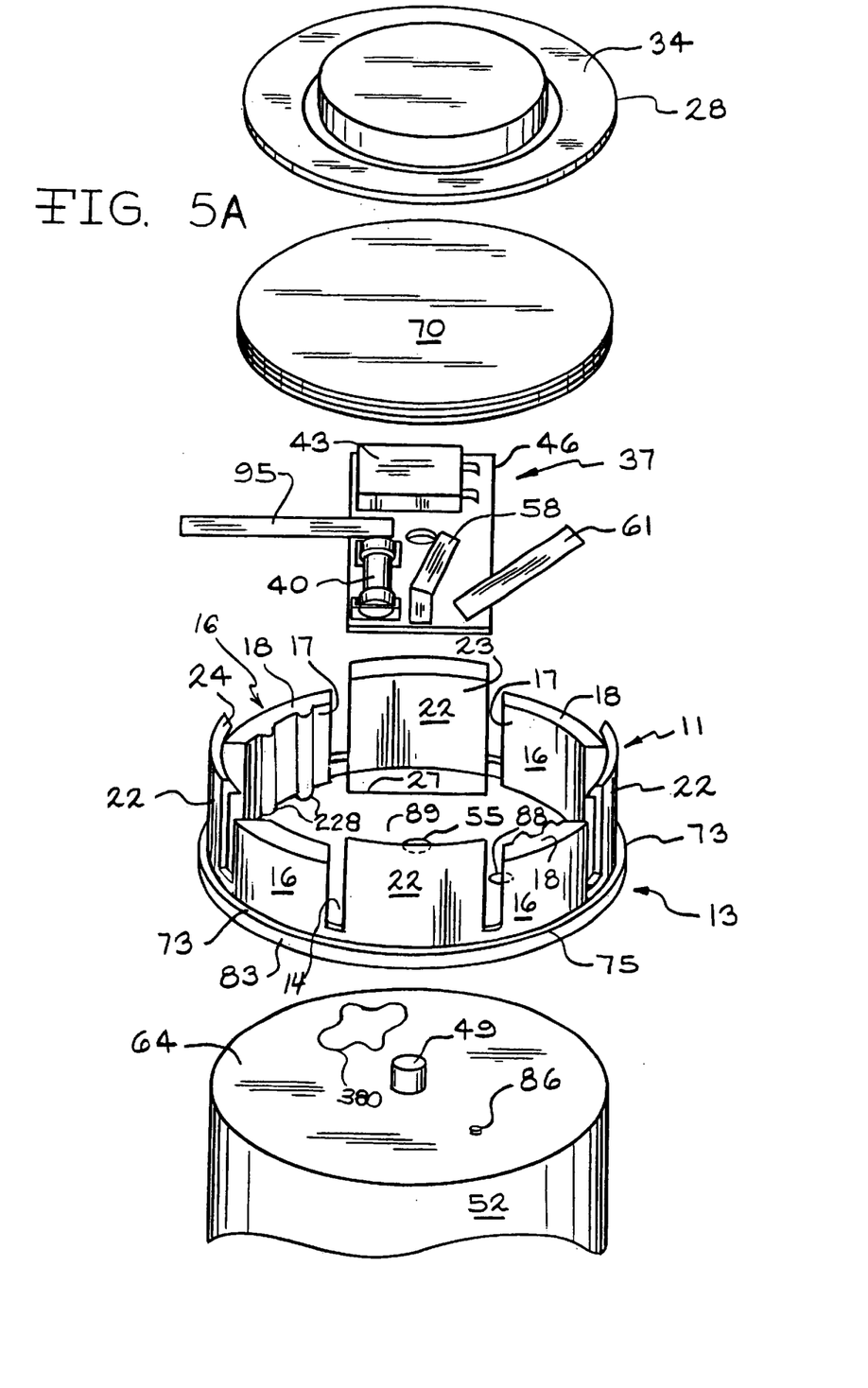
FIGS. 5A and 5B are exploded perspective views of different embodiments of the protection device and battery shown in FIG. 1.
Figure 5B:
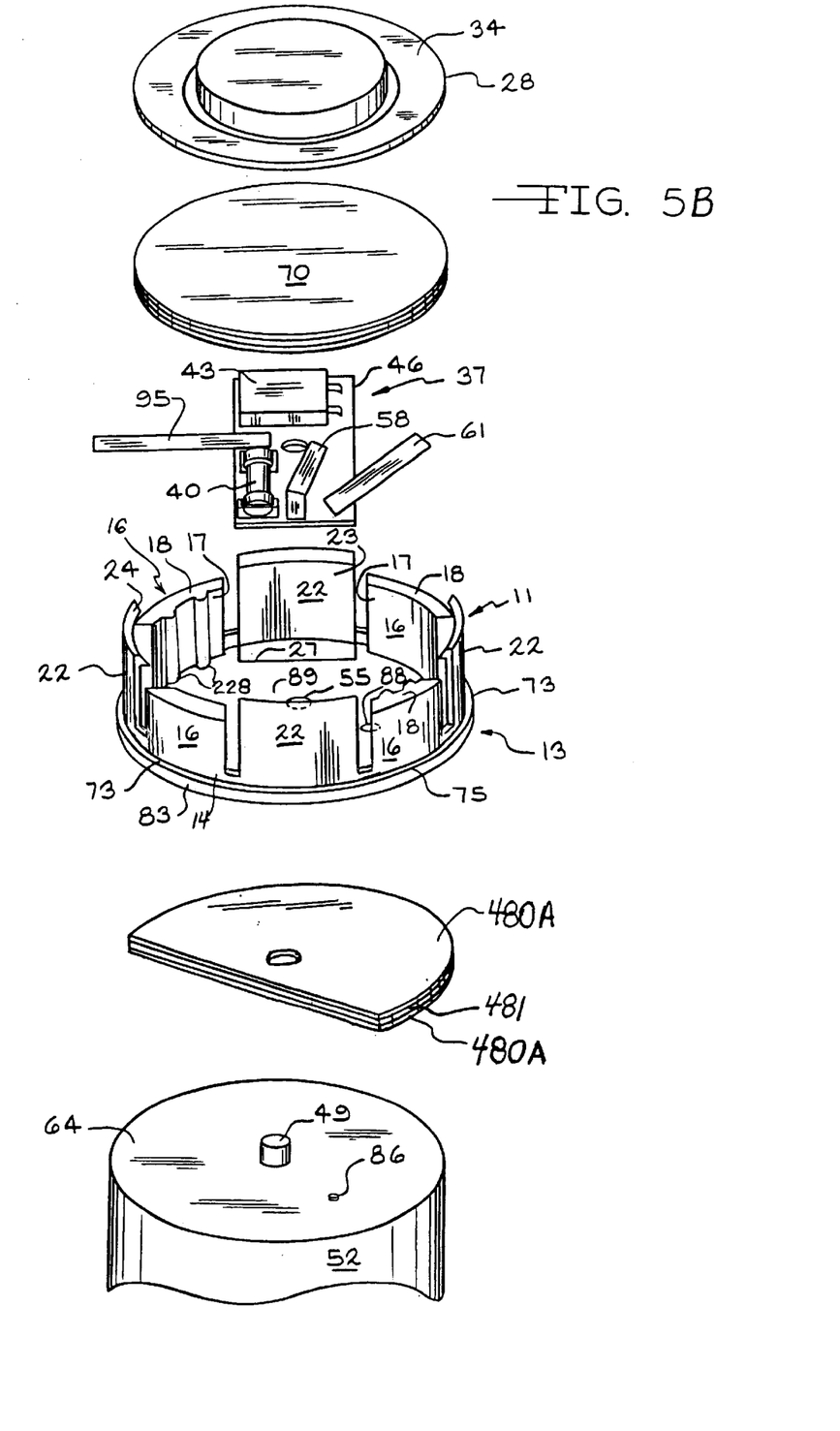
Figure 6:
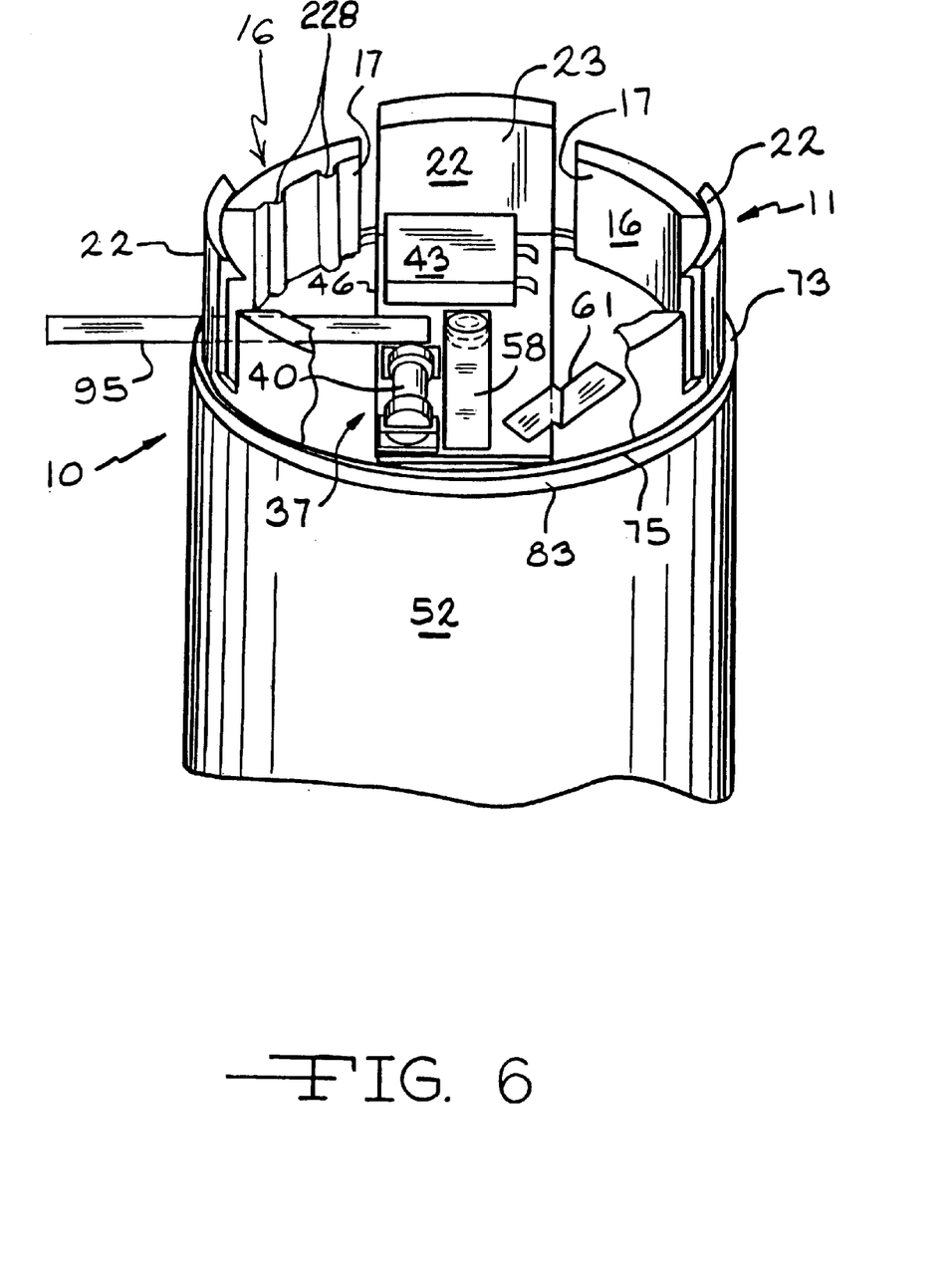
FIG. 6 is a perspective view of the battery, protective housing and electrical component shown in FIG. 1.

FIGS. 5A, 5B and 6 show the relative position of an electrical component 37 with respect to the protection device 10. The electrical component 37 may include a fuse 40 and a diode 43 mounted on an insulating substrate 46. Those skilled in the art will recognize that the diode 43 and/or substrate 46 may be omitted depending on the particular intended application. A terminal pin 49 of a battery 52 extends through a contact hole 55 in the base 12 and is connected to a first lead 58 of the electrical component 37 by welding the first lead 58 to the terminal pin 49. When the diode 43 is present in the electrical component 37, sometimes a second lead 61 is connected to a header 64 of the battery 52 by passing the second lead 61 through one of the molding orifices 27. The second lead 61 may be electrically connected to the header 64 by welding.

As shown in FIGS. 1, 5A and 5B, the present invention may include a compressible pad 70 for holding the electrical component 37 firmly in place. As shown in FIG. 1, once the terminal cap 28 contacts the retaining clip 22, the compressible pad 70 contacts and is compressed between portions of the electrical component 37 and portions of the terminal cap 28. The compressible pad 70 may serve also to hold the terminal cap 28 firmly against the retaining clip 22 and off of projecting shoulder 16. Those skilled in the art will recognize that an adhesive type material similar to that used in the prior art may be used by placing a removable retaining ring around the retaining clips 22 and projecting shoulders 16, or by using a fast curing or highly viscous adhesive material. The compressible pad 70 may be preferred because it reduces assembly costs and mess associated with the prior art adhesive material.

The compressible pad 70 may be a material which can withstand at least about 200° C., and may be a silicone based material. A silicone based material which is suitable for use in the compressible pad 70 is available from Furon Company of New Haven, Conn. as product number R10470 and referred to by the trademark COHRlastic®.

It is important to prevent the protective housing 11 from rotating relative to the battery 52 so that the first and second leads 58, 61 are not detached from the terminal pin 49 and header 64, respectively. Although the protective housing 11 is prevented to some extent from rotating by the first lead 58 connected to the terminal pin 49, and by the second lead 61 connected to the header 64, the protective housing 11 may be further prevented from rotating by providing a shelf 73, an edge 75 and a wrap 77. The shelf 73 is provided by positioning the retaining clip 22 to extend from a location on the primary surface 14 which is set back from a peripheral rim 83 of the base 12. The shelf 73 is defined by the intersections of the retaining clip 22 and the peripheral rim 83 with the primary surface 14. Alternatively, or in addition, the shelf 73 is provided by positioning the projecting shoulder 16 to extend from a location on the primary surface 14 which is set back from the peripheral rim 83 so as to define the shelf 73 formed by the intersections of the projecting shoulder 16 and the peripheral rim 83 with the primary surface 14. The intersection of the shelf 73 and the peripheral rim 83 defines the edge 75.

When the base 12 is provided with the shelf 73, a wrap 77, shown in FIG. 1, may be placed around a portion of the header 64 and a portion of the protective housing 11, including the shelf 73. The shelf 73 provides a discontinuity in the otherwise cylindrical surface covered by the wrap 77. The edge 75 extends into the wrap 77, thereby preventing the base 12 from rotating relative to the header 64 when the wrap 77 is sufficiently tight around the base 12 and battery 52. The wrap 77 may be made from an electrically insulating material such as polymerized tetrafluoroethylene or polyester. The wrap 77 may be heat-shrunk into the proper position.

When manufacturing certain types of batteries 52, electrolyte is introduced through the header 64 using a fill hole. Once the battery 52 has the proper amount of electrolyte inside, the fill hole is closed usually by welding a metallic material to the header 64. The metallic material often extends from the header 64 as a metallic projection 86, shown in FIGS. 5A and 5B. Although the metallic projection 86 does not extend far beyond the header 64, since it is desirable to have the base 12 firmly supported by the header 64, an accommodating orifice 88 may be positioned in the base 12 to accommodate the metallic projection 86 therein.

Figure 7:
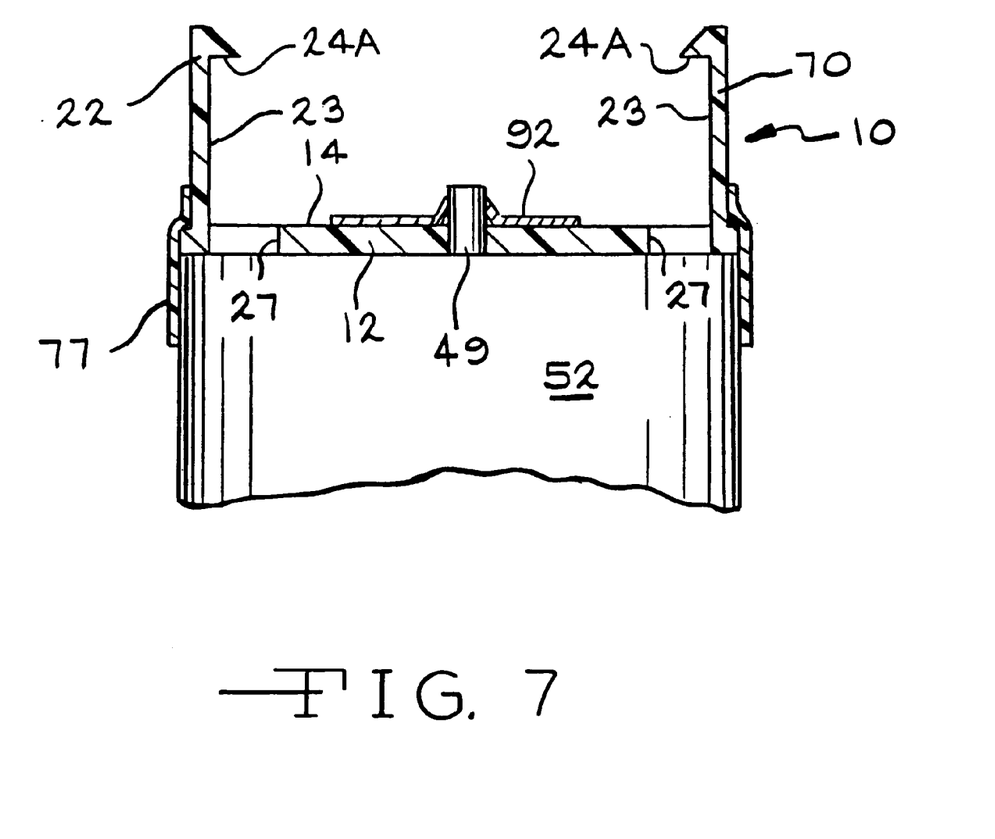
FIG. 7 is a partially cross sectioned side view of the protective housing taken along line 7—7 shown in FIG. 3.

To further secure the base 12 to the header 64, a fastener may be provided. As shown in FIG. 7, the fastener may be a tinnerman fastener 92 which contacts the base 12, and attaches to a portion of the terminal pin 49 extending through the contact hole 55.

The terminal cap 28 may be electrically conductive. A third lead 95, shown in FIGS. 2, 5A, 5B and 6, is electrically connected to the terminal cap 28. The third lead 95 may be electrically connected to the terminal cap 28 by welding.

Figure 8:
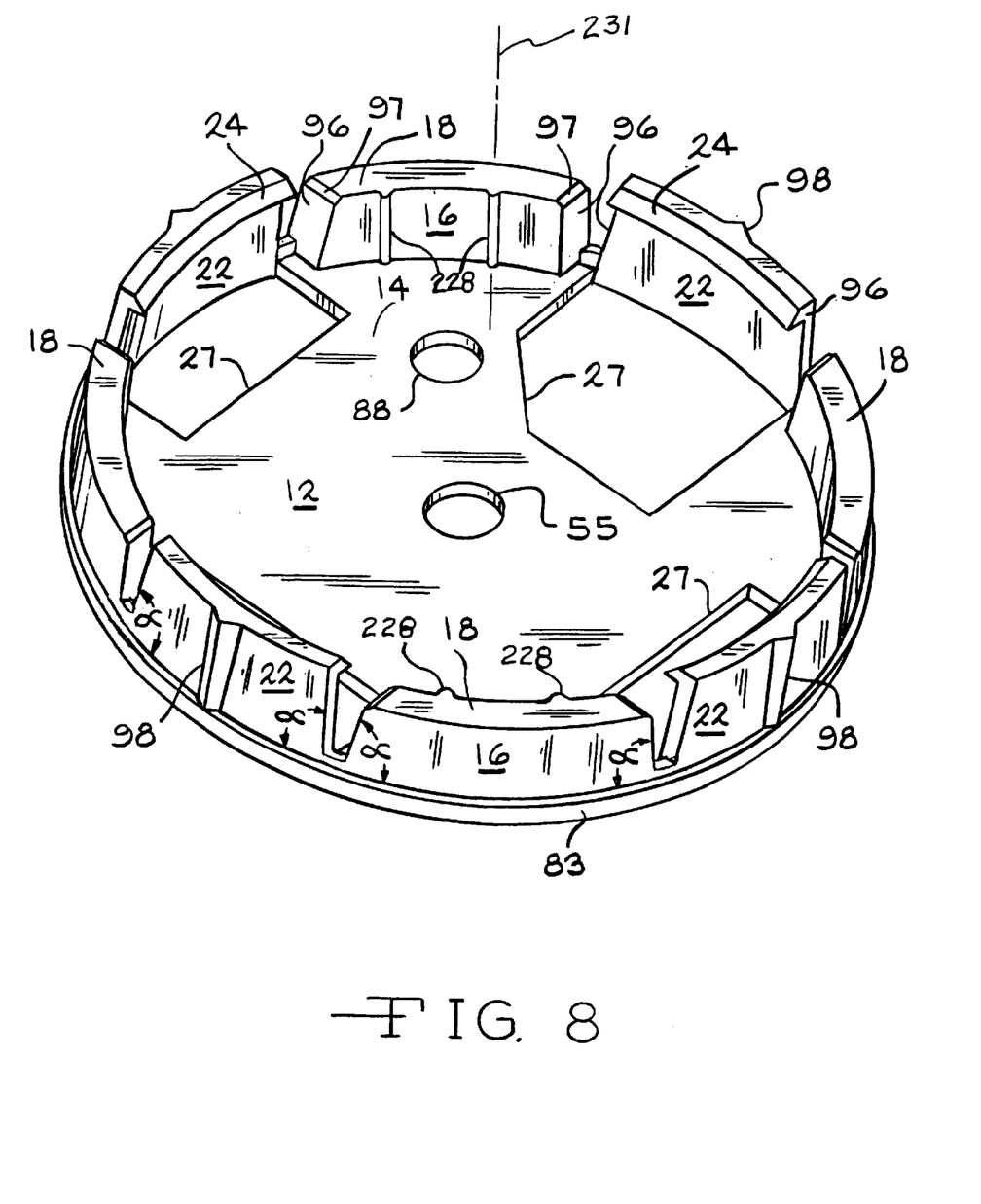
FIG. 8 is a perspective view of an alternative embodiment of the protective housing.

FIG. 8 shows an alternative embodiment of the protective housing 11. To facilitate molding the protective housing 11, interstitial side walls 96 of the projecting shoulders 16 and retaining clips 22 are tapered so that the interstitial side walls 96 do not form a right angle with the primary surface 14, and instead form an acute angle a with the primary surface 14. A five degree taper ($\alpha=85°$) is appropriate for facilitating separation of the mold from the protective housing 11 and for decreasing wear on the mold. Also shown in FIG. 8 are rounded edges 97 on the projecting shoulders 16 and retaining clips 22. A mold having rounded edges 97 is easier to construct. Finally, FIG. 8 shows ribs 98 on the retaining clips 22. The ribs 98 permit the material used to form the protective housing 22 to flow within the mold to completely and consistently form the retaining clips 22.

FIGS. 4, 5A, 5B, 6 and 8 depict an embodiment of the present invention wherein the protective housing 11 has a rib 228 on one or more of the projecting shoulders 16. The rib 228 may be oriented such that a longitudinal axis 231 of the rib 228 is substantially perpendicular to a primary surface 14 of the base 12. In one embodiment of the present invention, there are two ribs 228 on all of the shoulders 16. The ribs 228 enlarge the upper surface 18 to assure the terminal cap 28 does not move beyond the upper surface 18 closer to the base 12, and the ribs 228 also strengthen the protective housing 11 and make the protective housing 11 more rigid.

To secure the base 12 to the header 64, a fastener may be provided. For example, as shown in FIG. 5A the base 12 may be fixed relative to the header 64 by placing an adhesive 380 between the base 12 and the header 64. The adhesive 380 may be placed between the base 12 and the header 64 by any of the well known methods, including spraying, pouring or mixing the adhesive on one or more of the base 12 and the header 64. An acceptable adhesive 380 is cyanoacrylate. Another acceptable adhesive 380 is a pressure sensitive adhesive, such as product number 9500 manufactured by the 3M Company located in Minnetonka, Minn.

As shown in FIG. 5B, the present invention may include a spacer sheet 481 between the base 12 and the header 64. The spacer sheet 481 allows the protection device 10 to be seated firmly on the header 64, even when the header 64 or the base 12 has irregularities in it. The spacer sheet 481 may be flexible or compressible, or both. For example, the spacer sheet 481 may be made from an aramid insulating paper, such as Nomex 410™. A spacer sheet 481 having a thickness of approximately between 0.002 and 0.005 inches thick is known to be acceptable for many applications. To facilitate assembly of the protection device 10 to the header 64, the spacer sheet 481 may have one or more adhesive layers 480A for bonding to the header 64 and/or the base 12. As shown in FIG. 5B, there are adhesive layers 480A on opposite sides of the spacer sheet 481, however, the spacer sheet 481 need not have two adhesive layers 480A, and may have only one or no adhesive layers 480A.

The adhesive layer 480A may be made from the same materials as those described above for the adhesive 380. In addition, the 3M Company manufactures a polyester film tape, product number 9731, that can serve as a spacer sheet 481 and adhesive layers 480A. It should be noted that the thickness of the spacer sheet 481 and the adhesive layers 480A shown in FIG. 5B are not drawn to scale in order that the spacer sheet 481 and the adhesive layers 480A can be more easily understood.

Figure 9:
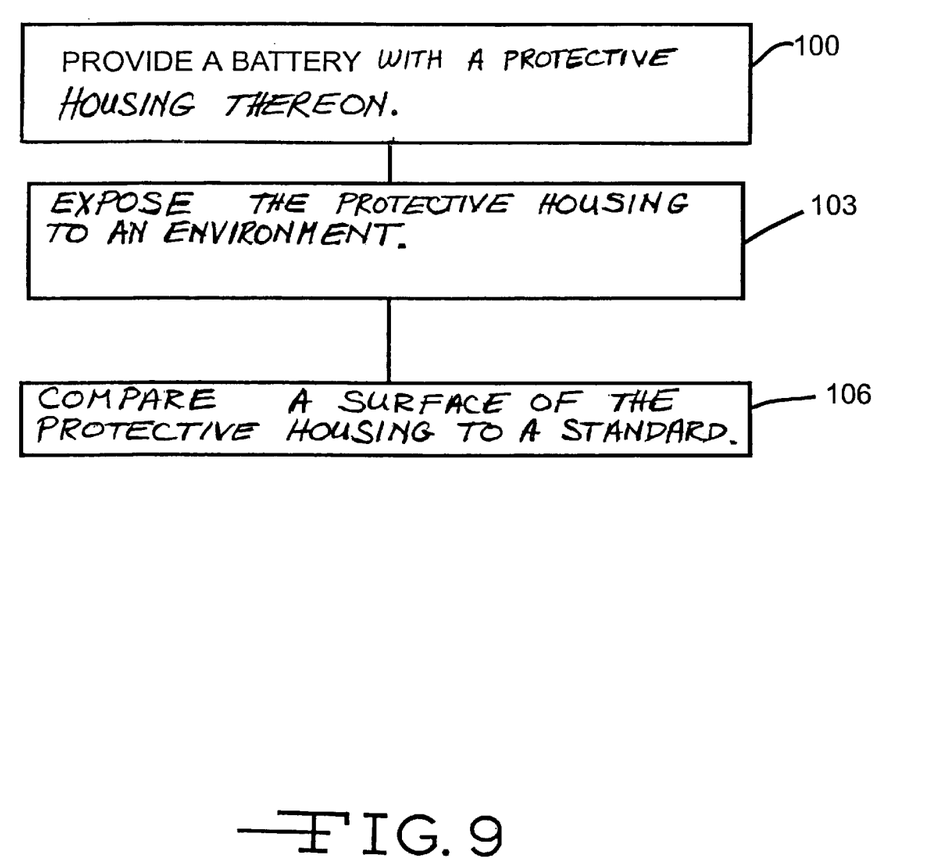
FIG. 9 is a flow chart of a method according to the present invention.

FIG. 9 shows steps of a method according to the present invention in which a battery and an electrical component, such as those described above, are tested to determine the temperature to which the protective housing was exposed. The method begins by providing (step 100) a battery and a protective housing, such as those described above. Next, the protective housing is exposed to an environment (step 103). Then the appearance of the protective housing is compared (step 106) to a standard. For example, the color, shininess or graininess may be used to determine the temperature to which the protective housing was exposed.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An electrical component protection device, comprising:
   a protective housing having a base with a contact hole therethrough for receiving an electrical terminal pin, and having a projecting shoulder extending from the base to a first distance from the base, the shoulder including a rib, and having a retaining clip extending from the base to a second distance from the base, the second distance being greater than the first distance; and a terminal cap having a first side and a second side, wherein in use, at least part of the first side of the terminal cap is prevented from moving beyond the projecting shoulder and at least part of the second side of the terminal cap [contacts] is restrained by the retaining clip, thereby permitting the electrical component to reside between and be protected by the housing and the terminal cap.

2. The protection device of claim 1, wherein the rib has a longitudinal axis that is substantially perpendicular to a primary surface of the base.

3. An electrical component protection device, comprising:

a protective housing made from a material including nylon and having a base with a contact hole therethrough for receiving an electrical terminal pin, and having a projecting shoulder extending from the base to a first distance from the base, the shoulder including a rib, and having a retaining clip extending from the base to a second distance from the base, the second distance being greater than the first distance; and a terminal cap having a first side and a second side, wherein in use, at least part of the first side of the terminal cap is prevented from moving beyond the projecting shoulder and at least part of the second side of the terminal cap is restrained by the retaining clip, thereby permitting the electrical component to reside between and be protected by the housing and the terminal cap.

4. The protection device of claim 3, wherein the material includes glass-filled nylon.

5. The protection device of claim 3, wherein the material includes nylon.

6. An electrical component protection device, comprising:

a protective housing made from a material including polyetheretherketone having a base with a contact hole therethrough for receiving an electrical terminal pin, and having a projecting shoulder extending from the base to a first distance from the base, the shoulder including a rib, and having a retaining clip extending from the base to a second distance from the base, the second distance being greater than the first distance; and a terminal cap having a first side and a second side, wherein in use, at least part of the first side of the terminal cap is prevented from moving beyond the projecting shoulder and at least part of the second side of the terminal cap is restrained by the retaining clip, thereby permitting the electrical component to reside between and be protected by the housing and the terminal cap.

7. An electrical power providing unit comprising:

a battery having a terminal pin;

an electrical component electrically connected to the battery;

an electrical component protection device, the protection device including a protective housing having a base with a contact hole therethrough for receiving the terminal pin of the battery, and having a projecting shoulder extending from the base to a first distance spaced from the base, and having a retaining clip extending from the base to a second distance spaced from the base, the second distance being greater than the first distance, wherein the electrical component is supported by the base;

a terminal cap having a first side and a second side, wherein at least part of the first side of the terminal cap is restrained by the projecting shoulder and at least part of the second side of the terminal cap is restrained by the retaining clip, wherein the electrical component resides between the base and the terminal cap; and an adhesive between the base and the battery.

8. The power providing unit of claim 7, further comprising a spacer sheet between the base and the battery.

9. The power providing unit of claim 8, wherein the adhesive is on a first side of the spacer sheet.

10. The power providing unit of claim 9, wherein the adhesive is also on a second side of the spacer sheet.

11. The power providing unit of claim 8, wherein the spacer sheet is compressible.

12. The power providing unit of claim 8, wherein the spacer sheet is flexible.

13. An electrical power providing unit comprising:

a battery having a terminal pin;

an electrical component electrically connected to the battery;

an electrical component protection device, the protection device including a protective housing having a base with a contact hole therethrough for receiving the terminal pin of the battery, and having a projecting shoulder extending from the base to a first distance spaced from the base, and having a retaining clip extending from the base to a second distance spaced from the base, the second distance being greater than the first distance, wherein the electrical component is supported by the base;

a spacer sheet between the battery and the base; and a terminal cap having a first side and a second side, wherein at least part of the first side of the terminal cap is restrained by the projecting shoulder and at least part of the second side of the terminal cap is restrained by the retaining clip, wherein the electrical component resides between the base and the terminal cap.

14. The power providing unit of claim 13, wherein the spacer sheet is compressible.

15. The power providing unit of claim 13, wherein the spacer sheet is flexible.

* * * * *

UNITED STATES PATENT AND TRADEMARK OFFICE
CERTIFICATE OF CORRECTION

PATENT NO.    : 6,437,239 B1
DATED         : August 20, 2002
INVENTOR(S)   : Zayatz It is certified that error appears in the above-identified patent and that said Letters Patent is hereby corrected as shown below:

Column 7,
Line 5, "[contacts]" should be deleted

Signed and Sealed this

Twenty-fifth Day of February, 2003

JAMES E. ROGAN
*Director of the United States Patent and Trademark Office*